United States Patent

[11] 3,601,677

| [72] | Inventor | Kenneth R. MacDavid<br>Clarence Center, N.Y. |
|---|---|---|
| [21] | Appl. No. | 867,582 |
| [22] | Filed | Oct. 20, 1969 |
| [45] | Patented | Aug. 24, 1971 |
| [73] | Assignee | Houdaille Industries, Inc.<br>Buffalo, N.Y. |

[54] TEMPERATURE COMPENSATED SERVOSYSTEM
4 Claims, 3 Drawing Figs.

[52] U.S. Cl. ............................................. 318/678,
 318/681, 318/345
[51] Int. Cl. ............................................. G05f 1/08
[50] Field of Search .......................................... 318/326,
 327, 293, 681, 678, 345

[56] References Cited
UNITED STATES PATENTS

| 3,369,160 | 2/1968 | Koppel et al. .................. | 318/681 X |
| 3,375,771 | 4/1968 | Balcom, Jr. ..................... | 318/681 X |
| 3,378,739 | 4/1968 | Livengood et al. ........... | 318/678 X |
| 3,393,354 | 7/1968 | Gaither et al. ................ | 318/327 X |
| 3,431,475 | 3/1969 | Wesner ....................... | 318/681 X |

Primary Examiner—Benjamin Dobeck
Attorney—Hill, Sherman, Meroni, Gross & Simpson ABSTRACT: A motor control circuit for a servosystem which includes trigger circuits for controlling the direction and speed of a motor and which has temperature compensation to assure accurate and positive control. The control system of this invention is very stable and is not affected by temperature changes because temperature compensating means including a transistor and a Zener diode are connected in circuit with a differential amplifier so as to compensate for any temperature variations.

TEMPERATURE COMPENSATED SERVOSYSTEM

BACKGROUND OF THE INVENTION

1. Field of the Invention

This invention relates in general to motor control circuits and in particular to motor control circuits for servosystems.

2. Description of the Prior Art

Phase control integrated circuits for motors have been known in which the motor runs in a single direction and utilizes a single-phase control circuit.

SUMMARY OF THE INVENTION

The present invention discloses a motor control circuit for a servosystem in which the motor may operate in either direction and in which the speed of the motor may be controlled by a pair of phase control circuits. The servosystem also utilizes temperature compensation to assure uniform response with changes in temperature.

Other objects, features and advantages of the invention will be readily apparent from the following description of preferred embodiments thereof taken in conjunction with the accompanying drawings, although variations and modifications may be effected without departing from the spirit and scope of the novel concepts of the disclosures, and in which:

DESCRIPTION OF THE PREFERRED EMBODIMENTS

Figure 1:
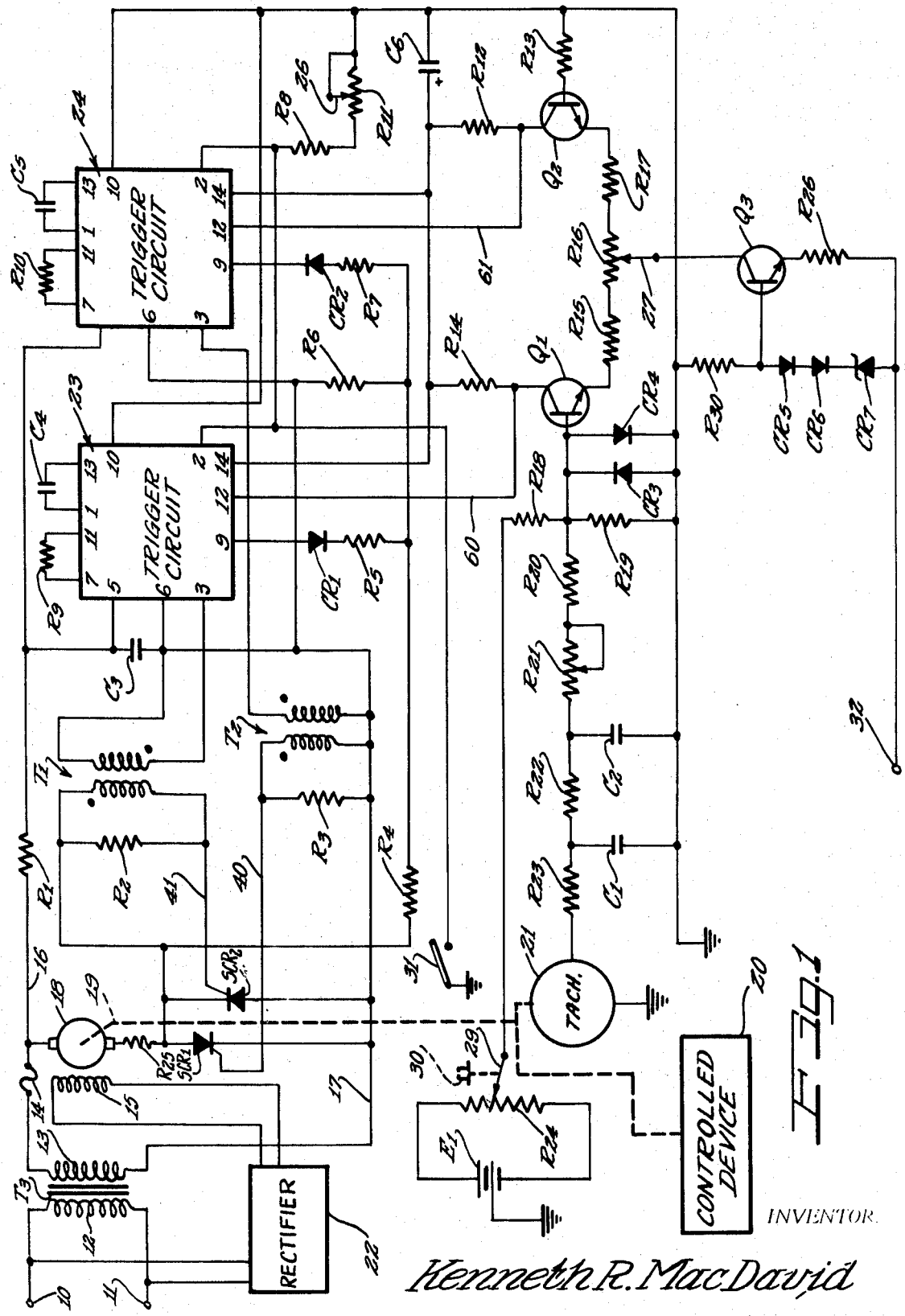
FIG. 1 is a schematic view of the motor control system of the invention.

FIG. 1 illustrates a servomotor 18 which has an output shaft 19 that is connected to a tachometer or rate generator 21. The output shaft 19 is also attached to a controlled device 20 which might be a turret lathe, for example, or any other controlled device. The winding 15 is the field winding of the motor 18 and is connected to the output of a rectifier 22 which is connected to AC power terminals 10 and 11. The primary 12 of a transformer $T_3$ is connected across terminals 10 and 11 and has a secondary 13 which has one side connected to the lead 17 and the other side connected to a fuse 14. A lead 16 is connected to the other side of the fuse 14. The armature of motor 18 has one terminal connected to lead 16 and the other terminal is connected to a resistor $R_{25}$. A pair of SCR's, SCR1 and SCR2, are connected back-to-back between the resistor $R_{25}$ and the lead 17 to control power to the armature of the motor from the leads 16 and 17. For example, the SCR1 supplies power to the motor when gated on when the lead 16 is positive relative to the lead 17 and the SCR2 supplies power to the armature when gated on when the lead 17 is positive relative to the lead 16. By way of example, a suitable voltage between the leads 16 and 17 might be 160 to 170 volts AC. The SCR's, SCR1 and SCR2, are controlled by the phase-controlled trigger circuits 23 and 24. These circuits might, for example, be General Electric Type PA436 monolithic integrated phase-controlled trigger circuits and the schematic for such circuits is given in FIG. 3. A transformer $T_1$ has its primary connected to output terminals 6 and 3 of the trigger circuit 23 and has one side of its secondary connected to the gate 41 of SCR2. The other side of the secondary of transformer $T_1$ is connected to the junction between the resistor $R_{25}$ and SCR1 and SCR2. A resistor $R_2$ is connected across the secondary of transformer $T_1$.

The trigger circuit 24 has its output terminals 6 and 3 connected to the primary of transformer $T_2$ and one side of the secondary is connected to the gate 40 of SCR1 and the other side of the secondary is connected to lead 17. A resistor $R_3$ is connected in parallel with the secondary or transformer $T_2$.

A resistor $R_4$ is connected from resistor $R_{25}$ and through a resistor $R_5$ to a diode CR1 which has its anode connected to terminal 9 of trigger circuit 23. Resistor $R_4$ is also connected through resistor $R_7$ through diode CR2 which has its cathode connected to terminal 9 of trigger circuit 24. The trigger circuit 23 is controlled by lead 60 which is connected to input terminal 12 of the trigger circuit and the lead 60 is connected to the collector of a differential amplifier transistor $Q_1$. The control terminal 12 of trigger circuit 24 is connected to the collector of differential amplifier transistor $Q_2$. Resistors $R_{15}$, $R_{16}$ and $R_{17}$ are connected in series between the emitters of transistors $Q_1$ and $Q_2$ and a contact 27 is slidably connected to resistor $R_{16}$ and is connected to the collector of a transistor $Q_3$. Transistor $Q_3$ has its emitter connected to a resistor $R_{26}$ which has its other side connected to a terminal 32 to which a suitable biasing voltage as, for example, 15 volts negative DC may be applied. A pair of diodes CR5 and CR6 are connected in series between the base of transistor $Q_3$ and the cathode of a Zener diode CR7 which has its anode connected to terminal 32. A resistor $R_{30}$ is connected from the base of transistor $Q_3$ to ground. A stop switch 31 has one side connected to ground and during operation is normally in the open circuit position. When the switch 31 is closed it connects input terminal 2 of trigger circuit 23 to ground to disable the servocontrol system. It also disables circuit 24. Resistors $R_4$ and $R_6$ form a voltage divider and resistors $R_5$ and $R_7$ are connected to the junction between $R_4$ and $R_6$.

The output of the tachometer 21 is connected to the base of the transistor $Q_1$ through the filter network comprising the resistors $R_{20}$, $R_{21}$, $R_{22}$ and $R_{23}$ and the parallel capacitors $C_1$ and $C_2$. A variable wiper contact 28 is connected to resistor $R_{21}$ to vary its resistance. A speed reference voltage is applied to the base of transistor $Q_1$ through the resistor $R_{18}$ from potentiometer $R_{24}$ which has a wiper contact 29 that may be controlled by knob 30. Battery $E_1$ is connected to opposite ends of resistor $R_{24}$ and the midpoint of $E_1$ is connected to ground. It is to be realized that the voltage applied to wiper contact 29 determines the direction and velocity of the servomotor and the motor will run in one direction with a positive voltage and in the opposite direction with a negative voltage and that the speed of the motor varies with the amplitude of the voltage supplied by the wiper contact 29. It is also to be realized that any command signal generator may be substituted for the potentiometer $R_{24}$ and the battery $E_1$.

The output of differential amplifier transistor $Q_1$ is connected to the trigger circuit 23 through lead 60 which is connected to lead 12 of trigger circuit 23 and the output of differential transistor $Q_2$ is connected through lead 61 to trigger circuit 24, terminal 12. Terminals 14 of trigger circuit 23 and 24 are connected together and to the collector of the transistors $Q_1$ and $Q_2$, respectively, through resistors $R_{14}$ and $R_{12}$. Terminals 14 jointly act as the positive power terminal for the differential amplifier. Capacitor $C_6$ is a filter capacitor to reduce ripple.

In operation, the rectifier 22 supplies a DC signal to the field winding 15 of the motor 18 and the motor 18 runs if the voltage on potentiometer wiper contact 29 is other than zero. Thus, if the knob 30 is moved relative to potentiometer 24 to put a speed reference voltage on contact 29 this voltage will be coupled to the base of transistor $Q_1$ and the differential amplifier comprising the transistors $Q_1$ and $Q_2$ will have differential currents which will cause one of the trigger circuits, either 23 or 24, to turn on one of the SCR's, SCR1 or SCR2. Suppose, for example, that the voltage at contact 29 has a first polarity which increases current in transistor $Q_1$ and decreases the current in transistor $Q_2$. This will be supplied to the trigger circuits and the trigger circuit 23, for example, may turn on the SCR2, for example, to cause power to be applied to the armature 18 when lead 17 has a positive voltage and lead 16 has a negative voltage. The trigger circuit 23 also controls the speed of the motor 18 by adjusting the phase of the trigger to SCR2 so that the velocity of the motor 18 varies as a function of the command on wiper contact 29. The diodes CR1 and CR2 cause the trigger circuits 23 and 24 to control the power during different phase angles. For example, the trigger circuit 24 may control the phase of the applied power from zero to 180° (positive) and the trigger circuit 23 may control the phase from 180° to 360° (negative).

The rate feedback from the tachometer 21 is applied to the base of transistor $Q_1$ through the filter network so that rate control is included. The transistor $Q_3$ in combination with the diodes CR5, CR6 and CR7 provides a temperature compensated constant current source for the differential amplifier so that the system operates without variations in output as a function of temperature.

The various potentiometers allow the speed to be controlled at a maximum rate and are used for balancing the circuit.

In the circuit illustrated in FIG. 1, for example, the knob 30 would be moved to the center position so as to provide zero voltage on the contact 29 to stop the servoamplifier although it is to be realized that position feedback may be utilized if desired.

Figure 2:
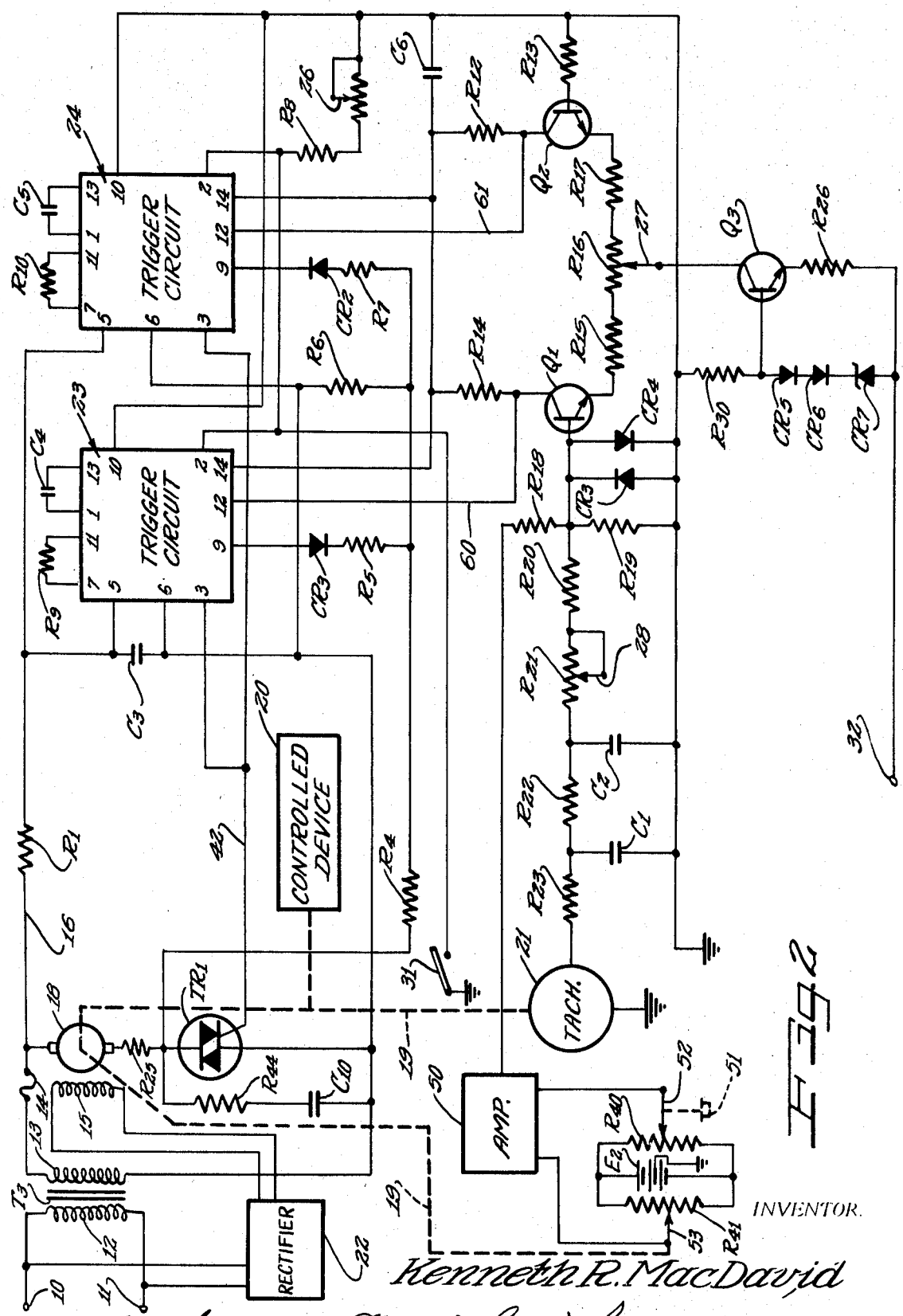
FIG. 2 is a schematic view of a modification of the invention.

FIG. 2 illustrates the modification of the servosystem of this invention wherein SCR1 and SCR2 are replaced by a triac which has a single gate electrode which triggers the triac for either positive or negative conduction. In FIG. 2, similar elements are labeled as in FIG. 1. In FIG. 2, for example, the transformers $T_1$ and $T_2$ are not used and the gate lead 42 is directly connected to terminals 3 of trigger circuits 23 and 24, respectively. Also, the output shaft 19 of motor 18 is connected to a position feedback wiper contact 53 which engages resistor 41. A resistor $R_{40}$ is connected in parallel with resistor $R_{41}$ and a voltage $E_2$ which has its center tap grounded is connected across the resistors $R_{40}$ and $R_{41}$. A wiper contact 52 engages the resistor $R_{40}$ and the position command knob 51 is connected to wiper contact 52. An amplifier 50 combines the signals from wiper contacts 52 and 53 and supplies an output through resistor $R_{18}$ to the base of transistor $Q_1$ to command a position.

A resistor $R_{44}$ and capacitor $C_{10}$ are connected in parallel with the triac TR1.

In operation, the circuit of FIG. 2 controls the armature current by gating the triac TR1 through the gate 42. The voltage on contact 52 determines the direction and velocity of the motor 18 and controls the trigger circuits 23 and 24 through the differential amplifier comprising the transistors $Q_1$ and $Q_2$ so that the motor 18 positions the control device 20 and the position followup contact 53 to balance out the commanded position.

The triac TR1 replaces the two SCR1's of FIG. 1 and allows current to pass through in either direction depending upon the time of triggering of the triac TR1 from the trigger circuits 23 and 24.

Figure 3:
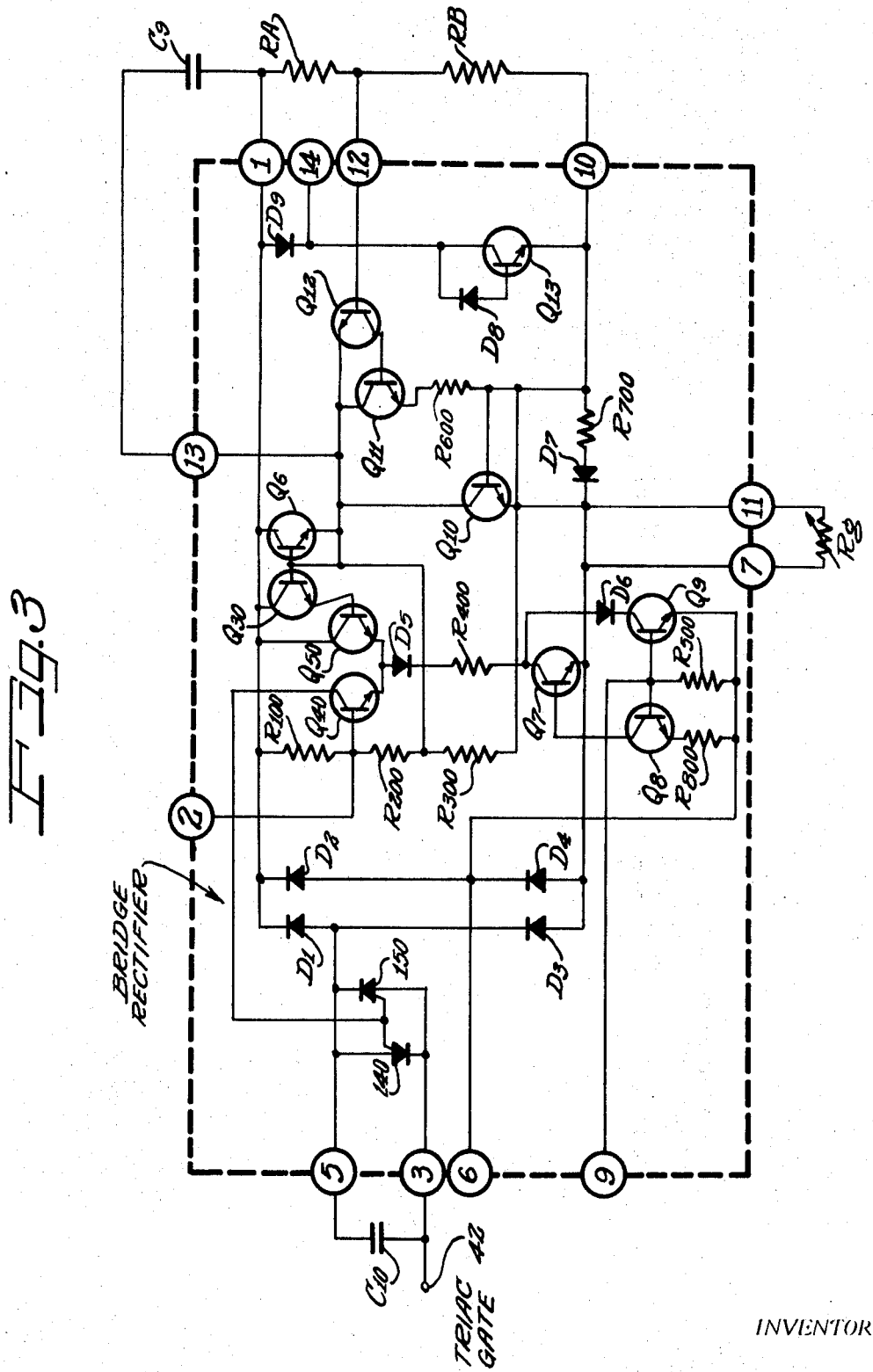
FIG. 3 is a schematic view of the phase control circuit of the invention.

FIG. 3 is the schematic diagram of the trigger circuits 23 and 24 which are General Electric Type PA436 phase-controlled trigger circuits.

The internal circuit of the PA436 is shown in FIG. 3, along with typical external contacts. Operating supply voltage for the circuit is obtained from the AC line from the bridge rectifier, and is clamped by the zener diode $D_9$ through transistor $Q_{13}$ and diode $D_8$. The clamped waveform appearing between terminals 1 and 10 is the supply for the pedestal and reference levels. Note that virtually all circuit current returns through resistor $R_{700}$ and diode $D_7$, and that this current waveshape is a full-wave rectified sinusoid.

A DC signal, such as from external divider $R_A$ and $R_B$, charges external timing capacitor $C_g$ to the pedestal level through the PNP emitter-follower $Q_{12}$, supplemented by $Q_{11}$, with current limited by $R_{600}$. Capacitor $C_g$ continues charging by a half-sine-wave current through $Q_{10}$ and external resistor $R_g$, forming the cosine ramp. This current waveshape is obtained by the voltage drop of supply current through $R_{700}$ applied to the base of $Q_{10}$. Amplitude of the ramp charging current is determined by the external emitter feedback resistor $R_g$, hence this resistor value establishes ramp amplitude. Diode $D_7$ compensates for the base-emitter voltage of $Q_{10}$.

The reference voltage level is obtained directly from the zener-clamped supply voltage by divider resistors $R_{100}$, $R_{200}$ and $R_{300}$. Reference voltage is brought out on terminal 2 and can be modified, if necessary, by external resistors to terminals 1 or 10.

The differential amplifier $Q_{30}$, $Q_{40}$ and $Q_{50}$ compares capacitor voltage to the reference voltage. The Darlington connection of $Q_{40}$ and $Q_{50}$ in addition to presenting a high impedance to the timing capacitor, provides an extra base-emitter voltage offset to compensate for the base-emitter drop of the pedestal emitter-follower $Q_{12}$. The apparent reference level (i.e. the voltage required at terminal 12 to trigger at the beginning of the ramp) only differs from the voltage at terminal 2 by the relatively small differences in base-emitter voltages of $Q_{30}$, $Q_{40}$, $Q_{50}$ and $Q_{12}$.

Common mode current of the differential comparator, through $D_5$ and $R_{400}$ is controlled by the lockout gate $D_6$, $Q_7$, $Q_8$ and $Q_9$. When load current is flowing through the triac, there is insufficient base drive on either $Q_8$ or $Q_9$ to enable conduction of common-mode current, hence the comparator is inhibited from producing an output signal to the trigger. When voltage appears across the triac, current through external resistor $R_{100}$ determines the triac voltage required to enable the comparator.

Trigger pulses are generated by the bilateral switch formed by 140 and 150 which discharge the external capacitor $C_{10}$ into the gate of the triac, 140 and 150 are triggered by conduction of $Q_{30}$ in the comparator, when the ramp voltage drops below the reference level, but only if common mode current can flow through the lockout gate. Since the trigger pulses alternate with the same polarity as the AC line voltage, they are ideally suited for triggering triacs directly, or pairs of SCR's through a 1:1 pulse transformer.

In order to avoid a carryover of information from one half-cycle to the next, the timing capacitor must be reset to a fixed level at the end of each half-cycle. This reset function is accomplished by $Q_6$ which is biased off by dividers $R_{100}$, $R_{200}$ and $R_{300}$ until supply voltage approaches zero. The capacitor voltage then provides a base drive to $Q_6$, thereby discharging the capacitor to the base emitter voltage drop.

Resistor $R_{25}$ may be zero if desired. Resistors $R_2$ and $R_3$ are damping resistors. Diodes may be used for this function, however, resistors have proven satisfactory in practice.

I claim as my invention:

1. A servomotor control circuit comprising, a motor with an armature and said motor rotates in a direction determined by the polarity of current applied to said armature, bidirectional current switching means with gating means connected in series with said armature, an alternating current power source connected across said armature and said switching means, a pair of phase-control trigger circuits connected to said gating means, a differential amplifier connected to said pair of trigger circuits, a polarized speed command signal means connected to said differential amplifier, said bidirectional current switching means comprises a pair of silicon-controlled rectifiers connected back-to-back in series with said armature, said pair of phase-control trigger circuits connected to the gating means of said silicon-controlled rectifiers, a first transformer connected between the gating means of the first of said pair of silicon-controlled rectifiers and the first of said pair of phase-control trigger circuits, a second transformer connected between the gating means of the second of said pair of silicon-controlled rectifiers and the second of said pair of phase-control trigger circuits, a first diode poled to pass current in a first direction between said armature and a first of said pair of phase-control trigger circuits, a second diode poled to pass current in a second direction between said armature and a second of said pair of phase-control trigger circuits, and a temperature compensating means connected in circuit with said differential amplifier.

2. A servomotor control circuit according to claim 1 wherein said temperature compensating means comprises a transistor with its output connected to said differential amplifier and a Zener diode connected between the base and emitter electrodes of said transistor.

3. A servomotor control circuit comprising, a motor with an armature and said motor rotates in a direction determined by the polarity of current applied to said armature, bidirectional current switching means with gating means connected in series with said armature, an alternating current power source connected across said armature and said switching means, a pair of phase-control trigger circuits connected to said gating means, a differential amplifier connected to said pair of trigger circuits, a polarized speed command signal means connected to said differential amplifier, a first diode poled to pass current in a first direction between said armature and a first of said pair of phase-control trigger circuits, a tachometer coupled to said motor and supplying a signal to said differential amplifier, a filter connected between said tachometer and said differential amplifier, said bidirectional current switching means comprises a triac and said pair of phase-control trigger circuits connected to the gating means of said triac, a resistor and a capacitor connected in parallel with said triac, a position followup signal generating means connected to said motor and said position followup signal generating means connected to said polarized speed command signal means, and a temperature compensating means connected in circuit with said differential amplifier.

4. A servomotor control circuit according to claim 3 wherein said temperature compensating means comprises a transistor with its output connected to said differential amplifier and a Zener diode connected between the base and emitter electrodes of said transistor.